United States Patent
Ng

(10) Patent No.: US 6,608,168 B1
(45) Date of Patent: Aug. 19, 2003

(54) POLYTRIMETHYLENE ETHER ESTERS

(75) Inventor: Howard C. Ng, Kingston (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/215,623

(22) Filed: Aug. 9, 2002

(51) Int. Cl.$^7$ .............................................. C08G 63/02
(52) U.S. Cl. ...................... 528/272; 528/275; 528/298; 528/302; 528/308; 528/308.6; 525/437; 525/440; 525/443; 525/444
(58) Field of Search .................. 528/272, 275, 528/298, 302, 308, 308.6; 525/437, 440, 443, 444

(56) References Cited

U.S. PATENT DOCUMENTS

| | | |
|---|---|---|
| 3,326,985 A | 6/1967 | Mason |
| 4,468,478 A | 8/1984 | Dexheimer et al. |
| 5,436,314 A | 7/1995 | Yang et al. |
| 2002/0007043 A1 | 1/2002 | Sunkara et al. |
| 2002/0010374 A1 | 1/2002 | Sunkara et al. |

OTHER PUBLICATIONS

"Block Copolymers", Encyclopedia of Polymer Science and Engineering, vol. 2, 388–401; G. Rress, G. Hurtrez, P. Bahadyr editors, John Wiley & Sons (1985).

C. B. Hu et al., "A New Criterion of Phase Separation: The Effect of Diamine Chain Extenders on the Properties of Polyurethaneureas", Journal of Applied Polymer Science, vol. 27, 2167–2177 (1982).

"Thermoplastic Elastomers", G. Holden et al. Editor; $2^{nd}$ Edition, 1996 (Hanser Publications, New York, NY).

"Spandex Elastic Fibers", Encyclopedia of Polymer Science and Engineering, vol. 6, 718–719; L. Rebenfeld editor, John Wiley & Sons (1986).

A. S. Abhiraman et al., "Evolution of Structure and Properties in Fiber Formation from a Thermoplastic Polyester–Polyether Segmented Copolymer", Journal of Polymer Science: Part B: Polymer Physics, vol. 25, 205–228 (1987).

P. A. Gunatillake et al., "Synthesis and Characterization of Hydroxy–Terminated Poly(alkylene oxides) by Condensation Polymerization of Diols*", Polymer International, vol. 27, No. 3, 275–283 (1992).

"Atomic Emission Spectroscopy", Analytical Instrumentation Handbook, 231–232, Galen Wood Ewing editor, Marcel Dekker, Inc. (1997).

W. Wang et al., "Dynamic Study of Crystallization– and Melting–Induced Phase Separation in PEEK/PEKK Blends", Macromolecules 30, 4544–4550 (1997).

*Primary Examiner*—Samuel A. Acquah
(74) *Attorney, Agent, or Firm*—Mark D. Kuller

(57) ABSTRACT

A random polytrimethylene ether ester prepared by polycondensation of 1,3-propanediol reactant and about 10 to about 0.1 mole % of aliphatic or aromatic diacid or diester, as well as its manufacture and use thereof.

22 Claims, No Drawings

POLYTRIMETHYLENE ETHER ESTERS

FIELD OF THE INVENTION

This invention relates to polytrimethylene ether esters, and their manufacture and use.

BACKGROUND OF THE INVENTION

Polytrimethylene ether glycol ("PO3G") and its use in thermoplastic elastomers, as well as in other applications, have been described in a number of patents and patent applications. PO3G can be prepared by dehydration of 1,3-propanediol or by ring opening polymerization of oxetane. PO3G can also be prepared from 1,3-propanediol, preferably as described in U.S. Published patent application Ser. Nos. 2002/7043 A1 and 2002/10374 A1, both of which are incorporated herein by reference.

Polyether ester elastomer comprising polytrimethylene ether ester soft segment and tetramethylene and trimethylene ester hard segments are described in U.S. patent application Ser. Nos. 10/016,195 and 10/016,023 both of which are incorporated herein by reference. Polytrimethylene ether ester amides are described in U.S. patent application Ser. No. 10/073,745, filed Feb. 11, 2002, which is incorporated herein by reference. Polyurethanes and polyurethane ureas are described in U.S. patent application Ser. No. 10/215,575, filed Aug. 9, 2002, which is incorporated herein by reference.

While not wishing to be bound by theory, it is believed that, due to the incompatibility of the hard and the soft segments, phase separation occurs. The two phases constitute the elastomeric matrix. The hard segments form microdomains of crystallites, while the soft segments and a fraction of the crystallizable hard component that has not reached crystalline order form the amorphous phase. It is known to those skilled in the art that the better the distinction between the crystalline microdomain and the amorphous phases the better the elastic properties. Phase separation and microdomain formation in block polymers directly influence thermal behavior, dynamic mechanical properties, mechanical and rheological properties, and permeability and transport phenomena of the elastomeric system. It is taught that the morphology of the elastomeric system, and its properties, depend heavily on the crystallization conditions of both the hard and soft segments. The block that crystallizes first has a tendency to "freeze" the entire structure, and in this way, to impose the crystallization of the other block. Thus, in order to form a clear two phase morphology, the more amorphous in nature of the soft segment, the better, as it will take longer and more difficult to crystallize (either by itself or induced by the hard segment residues in the soft segment phase).

In U.S. patent application Ser. Nos. 10/016,195 and 10/016,023, it was taught that a slower crystallizing polytrimethylene ether glycol soft segment in the block polymer elastomer provides better elastic properties (e.g., unloaded power, stress decay, % set) as compared to that of polytetramethylene ether glycol soft segment. Thus the soft segment needs to be as amorphous as possible, as measured by the crystallization rate. While polytrimethylene ether glycol itself provides an excellent soft segment, even more amorphous and more slowly crystallizing soft segments are desirable. More amorphous soft segments would lead to a better two-phase morphology and give further improvements in the final thermoplastic elastomers.

There is a continuing need to improve polytrimethylene ether glycol and thermoplastic elastomers made therefrom.

The present invention provides a novel random polytrimethylene ether ester and novel thermoplastic elastomers with advantageous properties.

SUMMARY OF THE INVENTION

The invention is directed to a random polytrimethylene ether ester prepared by polycondensation of 1,3-propanediol reactant and about 10 to about 0.1 mole % of aliphatic or aromatic diacid or diester.

It is also directed to a random polytrimethylene ether ester by polycondensation of about 90 to about 99.9 mole % of 1,3-propanediol reactant, calculated based on the amount of 1,3-propanediol and 1,3-propanediol units, and about 10 to about 0.1 mole % of aliphatic or aromatic diacid or diester.

In another embodiment, it is directed to a random polytrimethylene ether ester by polycondensation of about 80 to about 99.1 mole % of 1,3-propanediol reactant, calculated based on the amount of 1,3-propanediol and 1,3-propanediol units, about 10 to about 0.1 mole % of aliphatic or aromatic diacid or diester, and up to about 10 mole % of diol reactant other than 1,3-propanediol reactant, calculated based on the amount of diol and diol units.

In a further embodiment, it is directed to a random polytrimethylene ether ester by polycondensation of 1,3-propanediol reactant and about 10 to about 0.1 mole % of aliphatic or aromatic diacid.

The random polytrimethylene ether ester is preferably prepared from about 90 to about 99.9 mole % of the 1,3-propanediol reactant and the about 10 to about 0.1 mole % of aliphatic or aromatic diacid. In another embodiment, it is preferably prepared from about 80 to about 99.9 mole % of the 1,3-propanediol reactant, the about 10 to about 0.1 mole % of aliphatic or aromatic diacid, and up to about 10 mole % of diol reactant other than 1,3-propanediol reactant.

Preferably the 1,3-propanediol reactant is selected from the group consisting of 1,3-propanediol, and oligomers and prepolymers of 1,3-propanediol having a degree of polymerization of 2 to 9, and mixtures thereof.

In one preferred embodiment, the random polytrimethylene ether ester of claim 1 wherein the 1,3-propanediol reactant is 1,3-propanediol. In another preferred embodiment, the 1,3-propanediol reactant is selected from the group consisting of prepolymers of 1,3-propanediol having a degree of polymerization of 2 to 9 and mixtures thereof.

Preferably the aliphatic or aromatic diacid or ester is selected from the group consisting of aromatic dicarboxylic acids and esters, and combinations thereof.

Preferred is the aliphatic or aromatic diacid, and preferably the diacid is selected from the group consisting of aromatic dicarboxylic acids and combinations thereof. Preferably the aliphatic or aromatic diacid is an aromatic diacid selected from the group consisting of terephthalic acid, isophthalic acid, bibenzoic acid, naphthalic acid, bis(p-carboxyphenyl)methane, 1,5-naphthalene dicarboxylic acid, 2,6-naphthalene dicarboxylic acid, 2,7-naphthalene dicarboxylic acid, 4,4'-sulfonyl dibenzoic acid, p-(hydroxyethoxy)benzoic acid, and combinations thereof.

Preferably the aliphatic or aromatic diacid or diester is selected from the group consisting of terephthalic, bibenzoic, isophthalic and naphthalic acid; dimethyl terephthalate, bibenzoate, isophthlate, naphthalate and phthalate; and combinations thereof.

Preferably the aromatic diacid is selected from the group consisting of terephthalic acid and isophthalic acid. Most preferred it is terephthalic acid.

Preferably the random polytrimethylene ether ester is prepared from about 95 to 99.5 mole %, more preferably about 97.5 to 99 mole %, of the 1,3-propanediol reactant and about 5 to about 0.5 mole %, more preferably about 2.5 to about 1 mole %, of the aliphatic or aromatic diacid.

In another embodiment, the random polytrimethylene ether ester is preferably prepared from about 85 to about 99.5 mole %, more preferably about 87.5 to about 99 mole %, of the 1,3-propanediol reactant, about 5 to about 0.5 mole %, more preferably about 2.5 to about 1 mole %, of aliphatic or aromatic diacid or diester, and up to about 10 mole % of diol other than 1,3-propanediol reactant.

In one preferred embodiment, the random polytrimethylene ether ester is prepared by a process comprising the steps of: (a) providing (1) 1,3-propanediol reactant, (2) aliphatic or aromatic acid or ester; and (3) polycondensation catalyst; and (b) polycondensing the 1,3-propanediol reactant to form a random polytrimethylene ether ester, preferably at less than one atmosphere pressure.

In another preferred embodiment, the random polytrimethylene ether ester is prepared by a process continuous process comprising: (a) continuously providing (i) 1,3-propanediol reactant, (ii) aliphatic or aromatic acid or ester and (iii) polycondensation catalyst; and (b) continuously polycondensing the (i) 1,3-propanediol reactant and (ii) aliphatic or aromatic acid or ester to form random polytrimethylene ether ester.

The invention is also directed to thermoplastic elastomers prepared from the random polytrimethylene ether ester as a soft segment and a hard segment polymer selected from the group consisting of polyesters, polyamides, polyurethane, and polyurethane urea. One preferred embodiment is directed to a polyether ester elastomer comprising a soft segment from the random polytrimethylene ether ester and alkylene ester hard segment, preferably a $C_2$ to $C_{12}$ alkylene ester hard segment, preferably tetramethylene ester hard segment or trimethylene ester hard segment. Another preferred embodiment is directed to a polytrimethylene ether ester amide comprising a soft segment from the random polytrimethylene ether ester of claim 1 and a polyamide hard segment. Yet a further preferred embodiment is directed to a polyurethane or polyurethane urea elastomer prepared from (a) the random polytrimethylene ether ester, (b) diisocyanate and (c) diol or diamine chain extender.

The introduction of the minor amount terephthalic acid provides advantages, including: (a) decreasing the time for the reaction to produce desired molecular weight; and (b) providing a means to further decrease the crystallization rate and thereby providing a more amorphous character in the soft segments in the thermoplastic elastomers made with the polytrimethylene ether ester, as compared with those made with polytrimethylene ether glycol. Other advantages are described below.

DETAILED DESCRIPTION OF THE INVENTION

The invention is directed to random polytrimethylene ether esters prepared from 1,3-propanediol reactant and about 10 to about 0.1 mole % of aliphatic or aromatic diacid or diester, and their manufacture and use.

By "1,3-propanediol reactant" is meant 1,3-propanediol, and oligomers and prepolymers of 1,3-propanediol having a degree of polymerization of 2 to 20, preferably 2 to 9, and mixtures thereof. In addition, "oligomer" is used to refer to dimer and trimer of 1,3-propanediol; "prepolymer" is used to refer to 1,3-propanediol based compounds having a degree of polymerization of 4 to 20, and "polytrimethylene ether glycol" and "polytrimethylene ether ester" are used to refer to polymers having a Mn of 500 or more. The preferred starting material for this invention is 1,3-propanediol and, for simplicity, applicants will refer to 1,3-propanediol in describing the invention.

Diols other than 1,3-propanediol, and oligomers and prepolymers from such diols, can be used in preparing the invention, and are collectively referred to as "diol reactants" herein. The random polytrimethylene ether ester can contain up to about 10 mole % of repeating units from such diol reactants, calculated based on the amount of diol and diol units in the diol reactant. Suitable diols include aliphatic diols, for example 1,6-hexanediol, 1,7-heptanediol, 1,8-octanediol, 1,9-nonanediol, 1,10-decanediol, 1,12-dodecanediol, 3,3,4,4,5,5-hexafluro-1,5-pentanediol, 2,2,3,3,4,4,5,5-octafluoro-1,6-hexanediol, 3,3,4,4,5,5,6,6,7,7,8,8,9,9,10,10-hexadecafluoro-1,12-dodecanediol, cycloaliphatic diols, for example 1,4-cyclohexanediol, 1,4-cyclohexanedimethanol and isosorbide, and polyhydroxy compounds, for example glycerol, trimethylolpropane, and pentaerythritol. Preferred diols are selected from the group consisting of 2-methyl-1,3-propanediol, 2,2-dimethyl-1,3-propanediol, 2,2-diethyl-1,3-propanediol, 2-ethyl-2-(hydroxymethyl)-1,3-propanediol, 1,6-hexanediol, 1,8-octanediol, 1,10-decanediol, isosorbide, and mixtures thereof. In one preferred embodiment, such repeat units are not present in the polytrimethylene ether ester.

The aliphatic or aromatic diacid or diester can be aliphatic (including cycloaliphatic) or aromatic, or a combination thereof, and is preferably selected from the group consisting of aromatic dicarboxylic acids and esters (preferably short chain alkyl esters, and more preferably methyl esters), and combinations thereof. Preferred are aliphatic or aromatic diacids, and most preferred are aromatic dicarboxylic acids and combinations thereof.

Preferably the aliphatic or aromatic diacid is an aromatic diacid selected from the group consisting of terephthalic acid, isophthalic acid, bibenzoic acid, naphthalic acid, bis (p-carboxyphenyl)methane, 1,5-naphthalene dicarboxylic acid, 2,6-naphthalene dicarboxylic acid, 2,7-naphthalene dicarboxylic acid, 4,4'-sulfonyl dibenzoic acid, p-(hydroxyethoxy)benzoic acid, and combinations thereof. Of these, terephthalic acid and isophthalic acid, and mixtures thereof are preferred, with terephthalic acid being most preferred.

Preferably the aliphatic or aromatic diester is selected from the group consisting of dimethyl terephthalate, bibenzoate, isophthlate, naphthalate and phthalate; and combinations thereof. Of these, dimethyl terephthalate and isophthalate, and mixtures thereof are preferred, with dimethyl terephthalate being most preferred.

Most preferred is terephthalic acid.

The polytrimethylene ether ester has a number average molecular weight (Mn) of at least about 500, more preferably at least about 1,000, even more preferably at least about 1,500 and most preferably in the order of 2,000. The Mn is preferably up to about 3,000, and more preferably up to about 2,500. Reference herein to molecular weight, unless otherwise indicated is to Mn.

The random polytrimethylene ether esters of the invention are polytrimethylene ethers that predominately comprise polyether residues with a minor proportion of polyester linkages distributed randomly throughout the polymer. In particular, this invention relates to the manufacture of polymers of 1,3-propanediol containing a minor amount of terephthalic acid, with said terephthalic acid groups widely separated along the polymer chain. The terephthalic acid ester units are distributed along a predominantly polytrimethylene ether polymer backbone, and preferably do not contain two consecutive trimethylene terephthalate groups, i.e., are substantially, and preferably entirely, free of the monomer sequence (terephthalate)-1,3-propylene-(terephthalate).

The properties of the polytrimethylene ether esters of the invention are similar to those of polytrimethylene ether glycols. For example, the melting point of a polytrimethylene ether ester of the invention is a few degrees lower (e.g., 4 to 7° C.) than the melting point of a comparable polytrimethylene ether glycol, while the $T_g$ is up to about 20° C. higher than a comparable polytrimethylene ether glycol. This increase in $T_g$ correlates to the terephthalic acid content.

The random polytrimethylene ether esters of the invention are prepared by polycondensation (including (a) esterification or transesterification and (b) etherification) of 1,3-propanediol and terephthalic acid. The polytrimethylene ether esters are made using a mole ratio of from 0.1 to 10 mole %, preferably at least 0.5 mole %, most preferably at least 1 mole %, and preferably up to 5 mole %, most preferably up to 2.5 mole %, of diacid or diester. Above 10 mole % significant formation of the repeat ester sequences occurs (e.g. the monomer sequence (terephthalate)-1,3-propylene-(terephthalate) occurs). The formation of this sequence has the effect of (a) reducing the flexibility of the polyol chain and therefore reducing its effectiveness as a soft segment.

The process can be batch, semi-continuous, continuous, etc., and the acid or diester can be added prior to or during the reaction. The polytrimethylene ether esters of the invention are preferably prepared using the methods described in U.S. Published patent application Ser. Nos. 2002/7043 A1 and 2002/10374 A1, both of which are incorporated herein by reference, with further reaction of the diacid or diester to the 1,3-propanediol reactant. Thus, in one preferred embodiment, the random polytrimethylene ether ester is prepared by a process comprising the steps of: (a) providing (1) 1,3-propanediol reactant, (2) aliphatic or aromatic acid or ester; and (3) polycondensation catalyst; and (b) polycondensing the 1,3-propanediol reactant to form a random polytrimethylene ether ester, preferably at less than one atmosphere pressure. In one preferred embodiment thereof, the process comprises the steps of: (a) providing (1) 1,3-propanediol and (2) a polycondensation catalyst; (b) condensing 1,3-propanediol to form oligomer or prepolymer of 1,3-propanediol having a degree of polymerization of 2 to 20, preferably 2 to 9, or a mixture comprising one or more thereof; and (c) polycondensing the oligomer or prepolymer or mixture to form a polytrimethylene ether ester at less than one atmosphere pressure. The aliphatic or aromatic acid or ester can be added any time prior to or during step (b), or prior to step (c), or both. Preferably step b) is carried out at about atmospheric pressure, the pressure in step c) is less than 300 mm Hg (40 kPa), the temperature in step b) is about 150 to about 210° C. and the temperature in step c) is about 150 to about 250° C.

The polytrimethylene ether esters of the present invention can be produced continuously using the procedure of U.S. Published patent application Ser. No. 2002/10374 A1, preferably by adding the diacid or diester sequentially at the polymerization stage whereat the glycol has reached the desired molecular weight, and before the hydrolysis step. Thus, in another preferred process, the random polytrimethylene ether ester is prepared by a process continuous process comprising: (a) continuously providing (i) 1,3-propanediol reactant, (ii) aliphatic or aromatic acid or ester and (iii) polycondensation catalyst; and (b) continuously polycondensing the (i) 1,3-propanediol reactant and (ii) aliphatic or aromatic acid or ester to form random polytrimethylene ether ester. Preferably the polycondensing is carried out in two or more reaction stages. Preferably the polycondensing is carried out at a temperature greater than about 150° C., more preferably greater than about 180° C. and preferably less than about 250° C., more preferably less than about 210° C. Preferably the polycondensation is carried out at a pressure of less than one atmosphere, preferably at least about 50 mm Hg. In one preferred continuous process the polycondensation is carried out in an up-flow co-current column reactor and the 1,3-propanediol reactant and polytrimethylene ether glycol flow upward co-currently with the flow of gases and vapors, preferably where the reactor has 3 to 30 stages, more preferably 8 to 15 stages. The 1,3-propanediol reactant can be fed to the reactor at one or multiple locations. In another preferred embodiment, the polycondensation is carried out in a counter current vertical reactor wherein the 1,3-propanediol reactant and polytrimethylene ether glycol flow in a manner counter-current to the flow of gases and vapors. Preferably the reactor has two or more stages. Preferably the 1,3-propanediol reactant is fed at the top of the reactor, and preferably the 1,3-propanediol reactant is also fed at multiple locations to the reactor. In yet another preferred embodiment, the polycondensation is first carried out in at least one prepolymerizer reactor and then continued in a column reactor, the 1,3-propanediol reactant comprises 90 weight % or more 1,3-propanediol, and in the prepolymerizer reactor the 1,3-propanediol is polymerized with the catalyst to a degree of polymerization of at least 5. Most preferably, in the at least one prepolymerizer reactor the 1,3-propanediol is polymerized with the catalyst to a degree of polymerization of at least 10 and the column reactor comprises 3 to 30 stages. Preferably the at least one prepolymerizer reactor is a well-mixed tank reactor. The diacid or diester can be fed at one or more places, and is preferably fed in the earlier stages of the columns, for example anywhere in the first ⅔rds of the stages (e.g., stages 1 to 10 of a 15-stage reactor).

The polycondensation catalysts preferred for these reactions are described in U.S. Published patent application Ser. Nos. 2002/7043 A1 and 2002/10374 A1, both of which are incorporated herein by reference. They include homogeneous catalysts such as Lewis Acids, Bronsted Acids, super acids, and mixtures thereof. Examples include inorganic acids, organic sulfonic acids, heteropolyacids, and metal salts thereof. Preferred are sulfuric acid, fluorosulfonic acid, phosphorus acid, p-toluenesulfonic acid, benzenesulfonic acid, phosphotungstic acid, phosphomolybdic acid, trifluoromethanesulfonic acid, 1,1,2,2-tetrafluoroethanesulfonic acid, 1,1,1,2,3,3-hexafluoropropanesulfonic acid, bismuth triflate, yttrium triflate, ytterbium triflate, neodymium triflate, lanthanum triflate, scandium triflate and zirconium triflate. Heterogeneous catalysts, such as zeolites, fluorinated alumina, acid-treated silica, acid-treated silica-alumina, heteropolyacids and heteropolyacids supported on zirconia, titania, alumina and/or silica, can also be used. Preferred are the aforementioned homogeneous catalysts, and most preferred is sulfuric acid.

The diacid or diester addition leads to faster polymerization kinetics (i.e., faster reaction time) and results in a higher molecular weight polymer (i.e., random polytrimethylene ether ester) formed in the same reaction time as compared to a comparable polymerization carried out with 1,3-propanediol alone.

Purification (batch or continuous, etc.) can be carried out by hydrolysis as described in U.S. Published patent application Ser. Nos. 2002/7043 A1 and 2002/10374 A1, both of which are incorporated herein by reference, or by other means. The molecular weight of the polytrimethylene ether esters of the invention is not reduced during the hydrolysis step, indicating the 1,3-propylene-terephthalate ester linkage in the backbone of the polytrimethylene ether esters of the invention remains intact.

The conventional additives commonly used in polyether esters, polyether glycols and thermoplastic elastomers can be incorporated into the 1,3-propanediol reactants, the polytrimethylene ether esters, and the thermoplastic elastomers and other products made from the polytrimethylene ether esters, by known techniques. Such additives include delusterants (e.g., $TiO_2$, zinc sulfide or zinc oxide), colorants (e.g., dyes), stabilizers (e.g., antioxidants, ultraviolet light stabilizers, heat stabilizers, etc.), fillers, flame retardants, pigments, antimicrobial agents, antistatic agents, optical brighteners, extenders, processing aids, viscosity boosters, and other functional additives. As a specific example, an antioxidant prevents polyethers are subject to oxidation during storage. A preferred antioxidant stabilizer is 2,6 di-tert-butyl-p-cresol, also known as butylated hydroxy toluene or BHT, used at a level of 50 to 500 micrograms/g based on the weight of the polymer. The most preferred level is 100 micrograms/g.

The polytrimethylene ether esters can be used in the same manner as polytrimethylene ether glycol.

The invention is also directed to thermoplastic elastomer prepared from the random polytrimethylene ether ester as a soft segment and a hard segment polymer selected from the group consisting of polyether esters, polyamides, polyurethanes and polyurethane ureas, which can be prepared and used as described in U.S. patent application Ser. Nos. 10/016,195, 10/016,023, 10/073,745 and 10/016,195, 10/016,023, 10/073,745 and 10/215,575, which are incorporated herein by reference.

In one embodiment, the invention is directed to polyether ester elastomers comprising polytrimethylene ether ester soft segments and alkylene ester hard segments. These are block polymers. They preferably contain $C_2$ to $C_{12}$ alkylene ester hard segments. Preferred are tetramethylene ester hard segment, such as described in U.S. patent application Ser. No. 10/016,195 and trimethylene ester hard segment, such as described in U.S. patent application Ser. No. U.S. patent application Ser. No. 10/016,023, both of which are incorporated herein by reference. The preferred polyether ester elastomers, as well as their preparation and use, is basically the same as described in U.S. patent application Ser. Nos. 10/016,195 and 10/016,023.

The polyether ester elastomer preferably comprises about 90 to about 60 weight % polytrimethylene ether ester soft segment and about 10 to about 40 weight % alkylene ester hard segment. They preferably contain at least about 70 weight %, more preferably at least about 74 weight %, polytrimethylene ether ester soft segment, and preferably contain up to about 85, more preferably up to about 82 weight %, polytrimethylene ether ester soft segment. They preferably contain at least about 15 weight %, more preferably at least about 18 weight %, and preferably contain up to about 30 weight %, more preferably up to about 26 weight %, alkylene ester hard segment.

The mole ratio of hard segment to soft segment is preferably at least about 2.0, more preferably at least about 2.5, and is preferably up to about 4.5, more preferably up to about 4.0.

The polyether ester is preferably prepared by providing and reacting (a) polytrimethylene ether ester, (b) diol, preferably 1,4-butanediol or 1,3-propanediol, and (c) dicarboxylic acid, ester, acid chloride or acid anhydride. Preferably, the dicarboxylic acid, ester, acid chloride or acid anhydride is an aromatic dicarboxylic acid or ester, more preferably selected from the group consisting of dimethyl terephthalate, bibenzoate, isophthlate, phthalate and naphthalate; terephthalic, bibenzoic, isophthalic, phthalic and naphthalic acid; and mixtures thereof. Most preferred are terephthalic acid and dimethyl terephthalate.

The invention is also directed to fibers prepared from the polyether ester. Preferred fibers include monocomponent filament, staple fiber, multicomponent fiber such as bicomponent fiber (containing the polyether ester as at least one component). The fibers are used to prepare woven, knit and nonwoven fabric.

The polyether esters of this invention can be used to prepare melt spinnable thermoplastic elastomers having excellent strength and stretch-recovery properties.

In another embodiment, the invention is directed to polytrimethylene ether ester amides, similar to those described in U.S. patent application Ser. No. 10/073,745, filed Feb. 11, 2002, which is incorporated herein by reference, and their manufacture and use. These are block polymers. They contain polytrimethylene ether ester soft segments and polyamide hard segments.

The polyamide segment preferably has an average molar mass of at least about 300, more preferably at least about 400. Its average molar mass is preferably up to about 5,000, more preferably up to about 4,000 and most preferably up to about 3,000.

The polytrimethylene ether ester amide preferably comprises 1 up to an average of up to about 60 polyalkylene ether ester amide repeat units. Preferably it averages at least about 5, more preferably at least about 6, polyalkylene ether ester amide repeat units. Preferably it averages up to about 30, more preferably up to about 25, polyalkylene ether ester amide repeat units.

The weight percent of polyamide segment, also sometimes referred to as hard segment, is preferably at least about 10% and most preferably at least about 15% and is preferably up to about 60%, more preferably up to about 40%, and most preferably up to about 30%. The weight percent of polytrimethylene ether ester segment, also sometimes referred to as soft segment, is preferably up to about 90%, more preferably up to about 85%, and is preferably at least about 40%, more preferably at least about 60% and most preferably at least about 70%.

The polytrimethylene ether ester amide comprises polyamide hard segments joined by ester linkages to polytrimethylene ether ester soft segments and is prepared by reacting carboxyl terminated polyamide or diacid anhydride, diacid chloride or diester acid equivalents thereof and polyether ether ester under conditions such that ester linkages are formed. Preferably it is prepared by reacting carboxyl terminated polyamide and polyether ester comprising at least 50 weight %, more preferably at least 75 weight %, and most preferably about 85 to 100 weight %, polytrimethylene ether ester.

In one preferred embodiment the carboxyl terminated polyamide is the polycondensation product of lactam, amino-acid or a combination thereof with dicarboxylic acid. Preferably, the carboxyl terminated polyamide is the polycondensation product of $C_4$–$C_{14}$ lactam with $C_4$–$C_{14}$ dicarboxylic acid. More preferably, the carboxyl terminated polyamide is the polycondensation product of lactam selected from the group consisting of lauryl lactam, caprolactam and undecanolactam, and mixtures thereof, with dicarboxylic acid selected from the group consisting of succinic acid, adipic acid, suberic acid, azelaic acid, sebacic acid, undecanedioic acid, dodecanedioic acid, terephthalic acid, and isophthalic acid, and mixtures thereof. Alternatively, the carboxyl terminated polyamide is the polycondensation product of amino-acid with dicarboxylic acid, preferably $C_4$–$C_{14}$ amino-acid and preferably $C_4$–$C_{14}$ dicarboxylic acid. More preferably, the carboxyl terminated polyamide is the polycondensation product of amino-acid selected from the group consisting of 11-amino-undecanoic acid and 12-aminododecanoic acid, and mixtures thereof, with dicarboxylic acid selected from the group consisting of succinic acid, adipic acid, suberic acid, azelaic acid, sebacic acid, undecanedioic acid, dodecanedioic acid, terephthalic acid, and isophthalic acid, and mixtures thereof.

In another preferred embodiment, the carboxyl terminated polyamide is the condensation product of a dicarboxylic acid and diamine. Preferably, the carboxyl terminated polyamide is the condensation product of a $C_4$–$C_{14}$ alkyl dicarboxylic acid and $C_4$–$C_{14}$ diamine. More preferably, the polyamide is selected from the group consisting of nylon 6-6, 6-9, 6-10, 6-12 and 9-6.

The invention is also directed to shaped articles comprising the polytrimethylene ether ester amide. Preferred shaped articles include fibers, fabrics and films.

Polyurethanes and polyurethane ureas such as those described in U.S. patent application Ser. No. 10/215,575, filed Aug. 9, 2002 can be prepared with the random polytrimethylene ether esters of the invention, and can be used as described therein.

The introduction of the minor amount terephthalic acid provides a means to further decrease the crystallization rate in end products in which polytrimethylene ether esters are incorporated. Thus, thermoplastic elastomers prepared with the random polytrimethylene ether esters of this invention have substantially slower crystallization rates and, as a result, more amorphous character in the soft segments, than comparable thermoplastic elastomers prepared with comparable polytrimethylene ether glycols. For example, polytrimethylene ether glycol having an Mn of 1210 has a crystallization half time of 5.75 minutes at 35° C., whereas a comparable random polytrimethylene ether esters of the invention containing 1 mole % of terephthalic acid (equivalent to 2% by weight) has a crystallization half time of 16.13 minutes at 35° C. The crystallization half time of the random polytrimethylene ether esters of the invention versus polytrimethylene ether glycol is higher, which results in a slower crystallization of the polyether chains. Therefore, the polytrimethylene ether esters of the invention will stay in an amorphous state longer as compared to homogeneous polyethers such as polytrimethylene ether glycol. This remains true when the polytrimethylene ether esters of the invention is used as soft segment in the thermoplastic elastomers. This propensity for staying in the amorphous state longer results in a better phase separation of the hard and soft segments, which, in turn provides better elastic recovery properties in the thermoplastic elastomers.

The polymers of the present invention are also useful in other applications as similar known polymeric polyethers, such as polytetramethylene ether glycol and polytrimethylene ether glycol. For example, they may be used as one of the starting materials in the manufacture of shaped articles by injection molding, blow molding, extrusion and compression molding, and reactive extrusion in the manufacture of coatings, laminates and adhesives, in the manufacture of packaging and industrial films, and in the manufacture of foams and cast elastomers.

EXAMPLES

The following examples are presented for the purpose of illustrating the invention, and are not intended to be limiting. All parts, percentages, etc., are by weight unless otherwise indicated.

TEST METHODS

Test Method 1. Differential Scanning Calorimeter (DSC) and Crystallization Measurements:

Melting point ($T_m$), crystallization temperature ($T_c$), glass transition temperature ($T_g$), and heat of fusion ($\Delta H$) were determined using the procedure of the American Society for Testing Materials ASTM D-3418 (1988) using a DuPont DSC Instrument Model 2100 (E.I. du Pont de Nemours and Co., Wilmington, Del. ("DuPont")), according to the manufacturer's instructions. The heating and cooling rates were 10° C. per minute. The crystallization temperature range was determined by heating each sample from −100° C. to 50° C. and allowing the sample to cool to ambient temperature. From the resulting DSC scans, the $T_g$ and $T_c$ values were determined. The 5 mole % and 10 mole % TPA samples required more than one heating and cooling cycle before a very low heat of fusion was detected, indicating the crystallization becomes more difficult when the content of TPA increases. In these multiple cycles, the $T_g$ remained constant, indicating no change in composition. A clear Tm and Tg for TPA content higher than 10 mole % (e.g. in Comparative Examples B and C) could not be detected. Heat of fusion was not measurable in Comparative Examples B and C as there were no apparent melting peaks.

Test Method 2. Isothermal Crystallization Rate ($t_{1/2}$)

Crystallization rates were obtained using the isothermal crystallization method described by W. Wang et al. in Macromolecules Vol. 30, pages 4544 to 4550 (1997) using a Perkin-Elmer (Shelton, Conn.) DSC-7 instrument according to the manufacturer's instructions. Samples (6 to 8 mg) were separately heated from 25° C. to 100° C. at 50° C./minute and held at the upper temperature for one minute. The sample was then cooled rapidly at 200° C./minute to between −15° C. and −35° C. and held for 30 to 75 minutes until crystallization was completed.

In all the Examples, a commercial grade of 1,3-propanediol having a purity of >99.8% was used (available from DuPont). Terephthalic acid and 95 to 98% sulfuric acid, ACS reagent grade, were used as received from Sigma-Aldrich Fine Chemicals (Oakville, Ontario, Canada).

Example 1

Preparation of polytrimethylene ether of 1,3-propanediol and terephthalic acid—Characterization of the polytrimethylene ether ester product.

A 250 mL three-necked round bottom flask, equipped with a nitrogen inlet, a mechanical stirrer and a distillation head, was charged with 152 g (2.0 moles) of 1,3-propanediol and 3.32 g (0.02 moles, 1 mole % based on the diol) terephthalic acid (TPA). Nitrogen gas was bubbled through the liquid at 0.5 L/minute for 15 minutes and then 1.55 g of 98% sulfuric acid catalyst (1% by weight of the total monomers) was added to the diol and acid mixture. The mixture was stirred mechanically and heated to 170° C.

under a nitrogen blanket at atmospheric pressure. The water of the reaction was removed by distillation and collected continuously during the polymerization reaction. The reaction was continued for a period of 10 hours, after which time the reaction mixture was cooled while maintaining the nitrogen atmosphere. The crude polytrimethylene ether ester thus obtained had a number average molecular weight ($M_n$) of 1358 as determined by NMR (described below).

The crude polytrimethylene ether ester obtained using the above procedure was purified via hydrolysis. An equal volume of water was added to the crude polytrimethylene ether ester and the mixture thus formed was maintained at 100° C. under reflux and under a nitrogen atmosphere in a 500 mL round-bottom flask with a water-cooled condenser. After 1 hour the mixture was cooled and allowed to separate into two phases. The aqueous phase was decanted and the polyether phase collected. The hydrolyzed polytrimethylene ether ester was dried at 60° C. in a vacuum oven overnight. The number average molecular weight, as determined by NMR, of the hydrolyzed polytrimethylene ether ester was unchanged by the hydrolysis. The composition and number average molecular weight ($M_n$) of Example 1 is shown in Table 1.

Examples 2 to 4

Preparation of polytrimethylene ether of 1,3-propanediol and terephthalic acid—Characterization of the polytrimethylene ether ester product.

Examples 2 to 4 were prepared according to the procedure of Example 1, except that the amount of TPA was adjusted to 8.3, 16.6, and 33.2 g (2.5, 5, and 10 mole % based on the total amount of diol). The compositions and Mn values for Examples 2 to 4 are shown in Table 1.

Comparative Example A.

Polymerization of 1,3-propanediol—Characterization of the polytrimethylene ether glycol product.

Comparative Example A was prepared according to the procedure of Example 1, except that no TPA was included. Comparative Example A was a poly(trimethylene glycol). The composition and Mn for Comparative Examples A is shown in Table 1.

Comparative Examples B and C

Preparation of polytrimethylene ether of 1,3-propanediol and terephthalic acid—Characterization of the polytrimethylene ether ester product.

Comparative Examples B and C were prepared according to the procedure of Example 1, except that the amount of TPA was adjusted to 15 and 20 mole % based on the total amount of diol. The compositions and Mn values are shown in Table 1.

TABLE 1

Polymer Compositions

| Example # | TPA Content (mole %) | Mn of the Crude Polymer | Mn of the Purified Polymer |
|---|---|---|---|
| A | 0 | 1208 | 1210 |
| 1 | 1 | 1358 | 1395 |
| 2 | 2.5 | 1465 | 1419 |
| 3 | 5 | 1785 | 1793 |
| 4 | 10 | 2395 | 2260 |
| B | 15 | — | 2919 |
| C | 20 | — | 4173 |

Table 1 provides details of Examples 1 to 4 and Comparative Examples A to C. The table shows that the polyether polymerization efficiency was improved in the presence of the TPA. In the polymerization of the 1,3-propanediol under identical conditions (1% $H_2SO_4$ catalyst, 170° C.) at a fixed polymerization time of 10 hours, the addition of TPA significantly increased the molecular weight of the final polymer. Specifically, addition of between 1 to 10 mole % of TPA led to a 12 to 98% increase in the molecular weight of the resultant polymer, as compared to Comparative Example A. Furthermore, the hydrolysis procedure used for purification of polytrimethylene ether glycol (for Comparative Example A) was also be used for the purification of the crude polytrimethylene ether ester of the other examples without reduction in molecular weight. When the data in Table 1 were compared with the NMR spectral analysis results (as discussed above), it was shown that polytrimethylene ether ester was stoichiometrically identical to the monomer feed composition. For instance in the case of Example 3, 5 mole % TPA was fed, 5.14 mole % was determined to be present in the resultant polytrimethylene ether ester.

TABLE 2

Glass Transition (Tg), Crystallization ($T_c$), and Melting Point Temperatures ($T_m$) and Heat of Fusion.

| Example # | TPA Content | $T_g$ (° C.) | $T_m$ (° C.) | Heat of Fusion (J/g) |
|---|---|---|---|---|
| Comparative Example A | Control (0% TPA) | −80.05 | 18.2 | 89.1 |
| 1 | 1% mole TPA (2 wt. %) | −77.17 | 13.0 | 75.04 |
| 2 | 2.5 mole % TPA (5 wt. %) | −75.59 | 12.23 | 9.5 |
| 3 #1* | 5 mole % TPA (10 wt. %) | −72.15 | 11.46 | 4.59 |
| 3 #2* | 5 mole % TPA (10 wt. %) | −71.81 | 11.79 | 3.13 |
| 4 | 10 mole % TPA (20 wt. %) | −63.88 | 14.41 | 8.54 |
| Comparative Example B | 15 mole % TPA (30 wt. %) | — | — | — |
| Comparative Example C | 20 mole % TPA (40 wt. %) | — | — | — |

*Replicate Examples.

The data in Table 2 shows that, with increasing percentage of TPA, the $T_g$ increases and the crystallization time lengthens.

It also shows that Examples 1 to 4 had Tm values similar to those of Comparative Example A, but 4 to 7° C. lower. Comparative Examples 1 to 4 also had Tg values from −77 to −64° C. that were similar to the Tg of Comparative Example A (Tg −80° C.). Since both low Tm and low Tg values are required for a polyether to be used as soft segment in a thermoplastic elastomer, the polytrimethylene ether esters of the invention are well-suited for such use. Table 2 also shows that Examples 1 to 4 had heat of fusion values less than that of Comparative Example A. The heat of fusion in the polymer is a direct measure of the amount of crystallinity in the polymer, thus it is shown that there is less crystallization in the polymers than in the 3G control. Heat of Fusion was not measurable for Comparative Example B and C.

TABLE 3

Isothermal Crystallization Rates ($t_{1/2}$) versus
$T_{min}$ for Comparative Example A and Example 1.

| Crystallization Temperature (° C.) | $T_{1/2}$ for Comparative Example A (Control) | $T_{1/2}$ for Example 1 (3G +1 mole % TPA) |
| --- | --- | --- |
| −30 | 6.62 min | 15.13 min |
| −35 | 5.75 min | 16.13 min |

The crystallization $T_{1/2}$ is the half-life time of the first order crystallization process. The longer the $T_{1/2}$ value, the slower the crystallization, indicating the corresponding system is more amorphous. The data in Table 3 show that Comparative Example A had a $T_{1/2}$ at the crystallization temperature of −30° C. of 6.62 minutes. In contrast, Example 1 (1 mole % TPA) had a $T_{1/2}$ at the same temperature of 15.13 minutes. Similarly, at −35° C. the Comparative Example A had $T_{1/2}$ of 5.75 minutes and Example 1 16.13 minutes. This increase in crystallization half time of the polytrimethylene ether esters of the invention means slower crystallization of the polyether chains, therefore the polytrimethylene ether ester stays in an amorphous state longer compared to other polyethers such as polytetramethylene ether glycol and the unmodified polytrimethylene ether glycol. Thus when the polytrimethylene ether ester of Example 1 is used as soft segment in thermoplastic elastomers, the soft segment remains in the amorphous state longer, resulting in better phase separation of the hard and soft segment domains. In turn, better elastic recovery properties occur in the final product.

In the case of Example 4, the same isothermal crystallization measurement was made. Crystallization in this example was not detected, i.e., it was either too slow or did not take place. Thus this composition with a 10% TPA content is totally amorphous and consequently markedly different from the polyether glycol control.

Example 5

Polytrimethylene Ether Ester Structure

The structure of the random polytrimethylene ether esters of the invention was established by proton (400 MHz) nuclear magnetic resonance (NMR) spectra. The NMR spectra were obtained on the polytrimethylene ether esters of the invention at 25° C. using a 2% (w/v) solution in $CDCl_3$. The general NMR method for characterizing polyols is described by Gunatillake et al. in Polymer, 275-283, 27(3), (1992). The NMR spectra were used to confirm the structure of the random polytrimethylene ether esters of the invention and deduce the mole % composition of the random polytrimethylene ether esters of the invention. Additionally, NMR analysis established that the distribution of the TPA units is random and that the polymers do not contain significant amounts of the sequence (terephthalate)-1,3-propylene-(terephthalate) when the amount of TPA less than about 10 mole %.

In the proton NMR spectrum, the triplet at 3.70 to 3.82 ppm (parts per million) corresponds to the protons bonded to the alpha carbon in the —$CH_2OH$ end groups. The multiplet at 3.40 to 3.68 ppm corresponds to protons adjacent to ether groups —$CH_2$—O—$CH_2$—. The signal between 1.7 to 1.9 ppm corresponds to the center—$CH_2$— in the trimethylene —$CH_2$—CH—$_2$—$CH_2$— groups as observed in polytrimethylene ether glycol. In contrast to polytrimethylene ether glycol, a singlet at 8.1 ppm corresponds to the aromatic protons in -$pC_6H_4$— and the triplet at 4.4 corresponds to the alpha $CH_2$ protons attached to each side of the ester (—$CH_2$—O—CO—). The multiplet at 2 ppm corresponds to the beta-CH2 attached to the ester moiety (—$CH_2$—$CH_2$—O—CO—).

The integral areas of selected peaks and groups of peaks were measured and used to determine:

(1) The molar concentration of TPA. The value found for the polymer of Example 3 was 5.12%, corresponding to a weight percentage of 10.54%, in agreement with the weight of TPA (10%) fed to the reaction for synthesis of the polytrimethylene ether esters of the invention. (This same procedures was used to evaluate the molar concentration of the polymers of Examples 1–4 and Comparative Examples B and C.), (2) The molecular weigh of the polytrimethylene ether esters of Examples 1–4 and Comparative Examples A, B and C, and (3) The absence of the sequence (terephthalate)-1,3-propylene-(terephthalate). This sequence does occur in comparative polytrimethylene ether esters containing greater than 10% mole % TPA, and are characterized by triplets at 4.5 and 2.2 ppm. These two triplets are not present in polytrimethylene ether esters of the invention (Examples 1–4) having lower TPA content or Comparative Example A. For example, the NMR spectrum of Comparative Example C (20 mole % TPA) showed triplet signals at 4.5 and 2.2 ppm. These signals are characteristics of the blocky sequence structure of (terephthalate)-1,3-propylene-(terephthalate) in the polymer. Particularly the signal at 2.2 ppm corresponds to the proton attached to the beta carbon in this sequence. It was estimated that in Comparative Example C about 8 mole % of the TPA units were in block sequence and the rest were randomly distributed.

Finally, after the hydrolysis of the crude random polytrimethylene ether esters of the invention, NMR and attenuated total reflection Fourier transform infra-red (FTIR) spectra in the 1400 to 800 $cm^{-1}$ showed the ester linkage of the 1,3-propylene-terephthalate sequence in the polytrimethylene ether esters of the invention remained intact. Inductively-Coupled Plasma Atomic Emission Spectroscopy (See, Analytical Instrumentation Handbook, pages 231 to 232, (G. W. Ewing, Ed., Marcel Dekker, 1997)) analysis for sulfur showed the hydrolysis step removed about 96% or more of the sulfate groups.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the disclosure.

What is claimed is:

1. A random polytrimethylene ether ester prepared by polycondensation of 1,3-propanediol reactant and about 10 to about 0.1 mole % of aliphatic or aromatic diacid or diester.

2. A random polytrimethylene ether ester by polycondensation of 1,3-propanediol reactant and about 10 to about 0.1 mole % of aliphatic or aromatic diacid.

3. The random polytrimethylene ether ester as claimed in claim 2 prepared from about 90 to about 99.9 mole % of the 1,3-propanediol reactant and the about 10 to about 0.1 mole % of aliphatic or aromatic diacid.

4. The random polytrimethylene ether ester as claimed in claim 2 prepared from about 80 to about 99.9 mole % of the 1,3-propanediol reactant, the about 10 to about 0.1 mole % of aliphatic or aromatic diacid, and up to about 10 mole % of diol reactant other than 1,3-propanediol reactant.

5. The random polytrimethylene ether ester of claim 1 wherein the 1,3-propanediol reactant is selected from the group consisting of 1,3-propanediol, and oligomers and prepolymers of 1,3-propanediol having a degree of polymerization of 2 to 9, and mixtures thereof.

6. The random polytrimethylene ether ester of claim 2 wherein the 1,3-propanediol reactant is selected from the group consisting of 1,3-propanediol, and oligomers and prepolymers of 1,3-propanediol having a degree of polymerization of 2 to 9, and mixtures thereof.

7. The random polytrimethylene ether ester of claim 3 wherein the 1,3-propanediol reactant is selected from the group consisting of 1,3-propanediol, and oligomers and prepolymers of 1,3-propanediol having a degree of polymerization of 2 to 9, and mixtures thereof.

8. The random polytrimethylene ether ester of claim 4 wherein the 1,3-propanediol reactant is selected from the group consisting of 1,3-propanediol, and oligomers and prepolymers of 1,3-propanediol having a degree of polymerization of 2 to 9, and mixtures thereof.

9. The random polytrimethylene ether ester of claim 1 wherein the 1,3-propanediol reactant is 1,3-propanediol.

10. The random polytrimethylene ether ester of claim 1 wherein the 1,3-propanediol reactant is selected from the group consisting of prepolymers of 1,3-propanediol having a degree of polymerization of 4 to 9 and mixtures thereof.

11. The random polytrimethylene ether ester of claim 1 wherein the aliphatic or aromatic diacid or ester is selected from the group consisting of aromatic dicarboxylic acids and esters, and combinations thereof.

12. The random polytrimethylene ether ester of claim 3 wherein the aliphatic or aromatic diacid is selected from the group consisting of aromatic dicarboxylic acids and combinations thereof.

13. The random polytrimethylene ether ester of claim 3 wherein the aliphatic or aromatic diacid is an aromatic diacid selected from the group consisting of terephthalic acid, isophthalic acid, bibenzoic acid, naphthalic acid, bis(p-carboxyphenyl)methane, 1,5-naphthalene dicarboxylic acid, 2,6-naphthalene dicarboxylic acid, 2,7-naphthalene dicarboxylic acid, 4,4'-sulfonyl dibenzoic acid, p-(hydroxyethoxy)benzoic acid, and combinations thereof.

14. The random polytrimethylene ether ester of claim 3 wherein the aromatic diacid is selected from the group consisting of terephthalic acid, isophthalic acid, bibenzoic acid, naphthalic acid, bis(p-carboxyphenyl)methane, 1,5-naphthalene dicarboxylic acid, 2,6-naphthalene dicarboxylic acid, 2,7-naphthalene dicarboxylic acid, 4,4'-sulfonyl dibenzoic acid, p-(hydroxyethoxy)benzoic acid, and combinations thereof.

15. The random polytrimethylene ether ester of claim 1 wherein the aliphatic or aromatic diacid or diester is selected from the group consisting of terephthalic, bibenzoic, isophthalic and naphthalic acid; dimethyl terephthalate, bibenzoate, isophthlate, naphthalate and phthalate; and combinations thereof.

16. The random polytrimethylene ether ester of claim 2 wherein the aliphatic or aromatic diacid is terephthalic acid.

17. The random polytrimethylene ether ester of claim 3 wherein the aliphatic or aromatic diacid is terephthalic acid.

18. The random polytrimethylene ether ester of claim 1 prepared from about 95 to 99.5 mole % of the 1,3-propanediol reactant and about 5 to about 0.5 mole % of the aliphatic or aromatic diacid.

19. The random polytrimethylene ether ester of claim 1 prepared from about 97.5 to 99 mole % of the 1,3-propanediol reactant and about 2.5 to about 1 mole % of the aliphatic or aromatic diacid.

20. The random polytrimethylene ether ester of claim 3 prepared from about 87.5 to about 99 mole % of the 1,3-propanediol reactant, about 2.5 to about 1 mole % of aliphatic or aromatic diacid or diester, and up to about 10 mole % of diol other than 1,3-propanediol reactant.

21. A random polytrimethylene ether ester as claimed in claim 1 prepared by a process comprising the steps of:
    (a) providing (1) 1,3-propanediol reactant, (2) aliphatic or aromatic acid or ester; and (3) polycondensation catalyst; and
    (b) polycondensing the 1,3-propanediol reactant to form a random polytrimethylene ether ester.

22. A random polytrimethylene ether ester as claimed in claim 1 prepared by a process continuous process comprising:
    (a) continuously providing (i) 1,3-propanediol reactant, (ii) aliphatic or aromatic acid or ester and (iii) polycondensation catalyst; and
    (b) continuously polycondensing the (i) 1,3-propanediol reactant and (ii) aliphatic or aromatic acid or ester to form random polytrimethylene ether ester.

* * * * *